United States Patent
Echigo et al.

[19]

[11] Patent Number: 5,960,119
[45] Date of Patent: Sep. 28, 1999

[54] METHOD OF AND SYSTEM FOR ENCODING DIGITAL IMAGES

[75] Inventors: Tomio Echigo, Yokohama; Junji Maeda, Tokyo-to; Jung-Kook Hong, Tokyo-to; Mikihiro Ioka, Tokyo-to, all of Japan

[73] Assignee: International Business Machines Corporation, Armonk, N.Y.

[21] Appl. No.: 08/697,657

[22] Filed: Aug. 28, 1996

[30] Foreign Application Priority Data

Jan. 9, 1995 [JP] Japan ..................................... 7-225390

[51] Int. Cl.$^6$ .......................... H04N 1/419; H04N 1/417; H04N 1/415; G06K 9/36
[52] U.S. Cl. .......................... 382/248; 382/232; 382/240; 382/250; 358/261.1; 358/261.2; 358/261.3; 358/426; 358/432; 358/433
[58] Field of Search ................................ 385/426, 261.1, 385/261.2, 261.3, 427, 433, 432, 448, 453, 538; 382/232, 240, 248, 250, 170, 171; 348/405, 415, 416, 408

[56] References Cited

U.S. PATENT DOCUMENTS

| | | | |
|---|---|---|---|
| 5,537,487 | 7/1996 | Miyajima et al. | 382/144 |
| 5,568,569 | 10/1996 | Golin | 382/236 |
| 5,617,485 | 4/1997 | Ohuchi et al. | 382/176 |

*Primary Examiner*—Edward L. Coles
*Assistant Examiner*—Mark Wallerson
*Attorney, Agent, or Firm*—Ronald L. Drumheller

[57] ABSTRACT

Edge information sensitive to a visual characteristic is efficiently stored, block artifacts are reduced, and highly efficient compression is accomplished by an image compressing method. The system encodes a digital image and includes: an image input for inputting the digital image; a segmenter for segmenting the digital image into a plurality of primitive regions and computing parameters about the luminance and chrominances of the primitive region for each the primitive region; a first merger for merging the plurality of primitive regions to generate first-order block candidates and classifying each of the first-order block candidates into any of a plurality of predetermined patterns; a first clusterer for clustering, among the first-order block candidates belonging to the same classification, the first-order block candidates, where the parameters about the luminance and chrominances of the primitive regions thereof can be approximated with linear transformation, as a first-order block, and representing a transformation coefficient of the linear transformation with a parameter; a second merger for merging a plurality of the first-order blocks to generate second-order block candidates and classifying the second-order block candidate in accordance with the pattern of each the first-order blocks of the second-order block candidate; a second clusterer for clustering, among the second-order block candidates belonging to the same classification, the second-order block candidates, where the transformation coefficients of the first-order blocks thereof can be approximated with linear transformation, as a second-order block, and representing a transformation coefficient of the linear transformation with a parameter; a controller for recursively executing the clustering of the block candidates while raising the order of the block in sequence until the clustering of the blocks becomes impossible; and an encoder for encoding the parameters of the coexisting multi-order blocks.

19 Claims, 8 Drawing Sheets

FIG.2
PRIMITIVE REGION
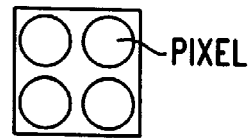
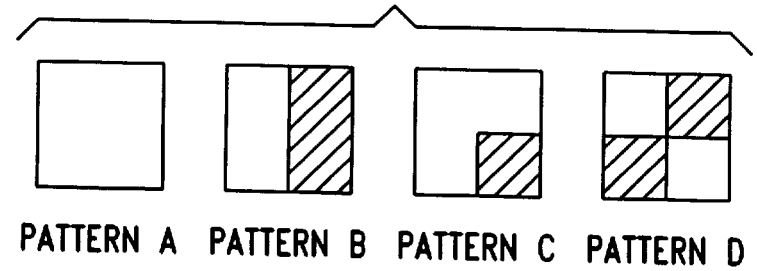
PATTERN A   PATTERN B   PATTERN C   PATTERN D
FIG.3
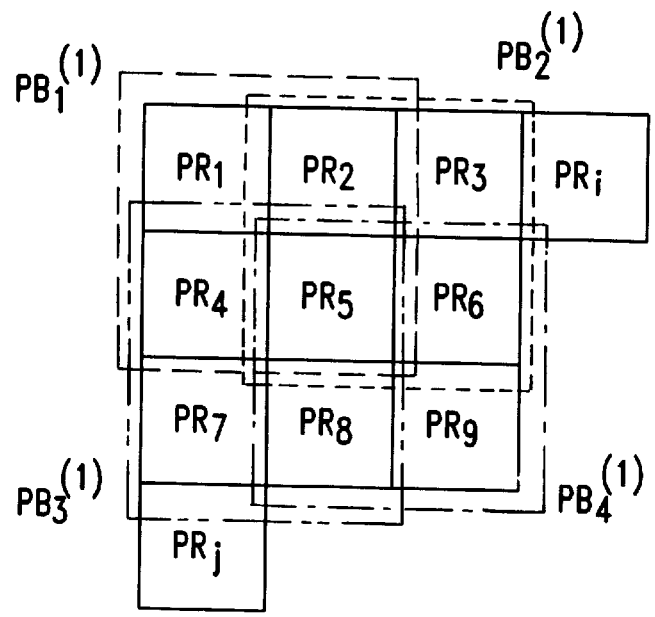
FIG.7
| ADD $\phi^{(1)}$ | ADD $\phi^{(1)}$ |
|---|---|
| ADD $\phi^{(1)}$ | ADD $\phi^{(1)}$ |

FIG.5

| FREQUENCY NUMBER (N) | PATTERN OF BLOCK CANDIDATE | | | | ROTATIONAL ANGLE OF BLOCK CANDIDATE | | | | BLOCK CANDIDATE |
|---|---|---|---|---|---|---|---|---|---|
| | UPPER LEFT | LOWER LEFT | LOWER RIGHT | UPPER RIGHT | UPPER LEFT | LOWER LEFT | LOWER RIGHT | UPPER RIGHT | |
| 1 | C | C | A | C | 0 | 180 | 0 | 180 | $RB_n(\theta=0), RB_m(\theta^{(1)}=270), RB_o(\theta^{(1)}=90), \ldots$ |
| | | | | | 0 | 90 | 90 | 270 | $RB_a(\theta=0), RB_b(\theta^{(1)}=90), RB_d(\theta^{(1)}=0), \ldots$ |
| | | | | | 90 | 90 | 180 | 270 | $RB_c(\theta=0), RB_e(\theta^{(1)}=180), RB_f(\theta^{(1)}=0), \ldots$ |
| | | | | | ..... | ..... | ..... | ..... | ..... |
| 2 | C | B | A | A | | | | | |
| 3 | | | | | | | | | |
| 64 | | | | | | | | | |

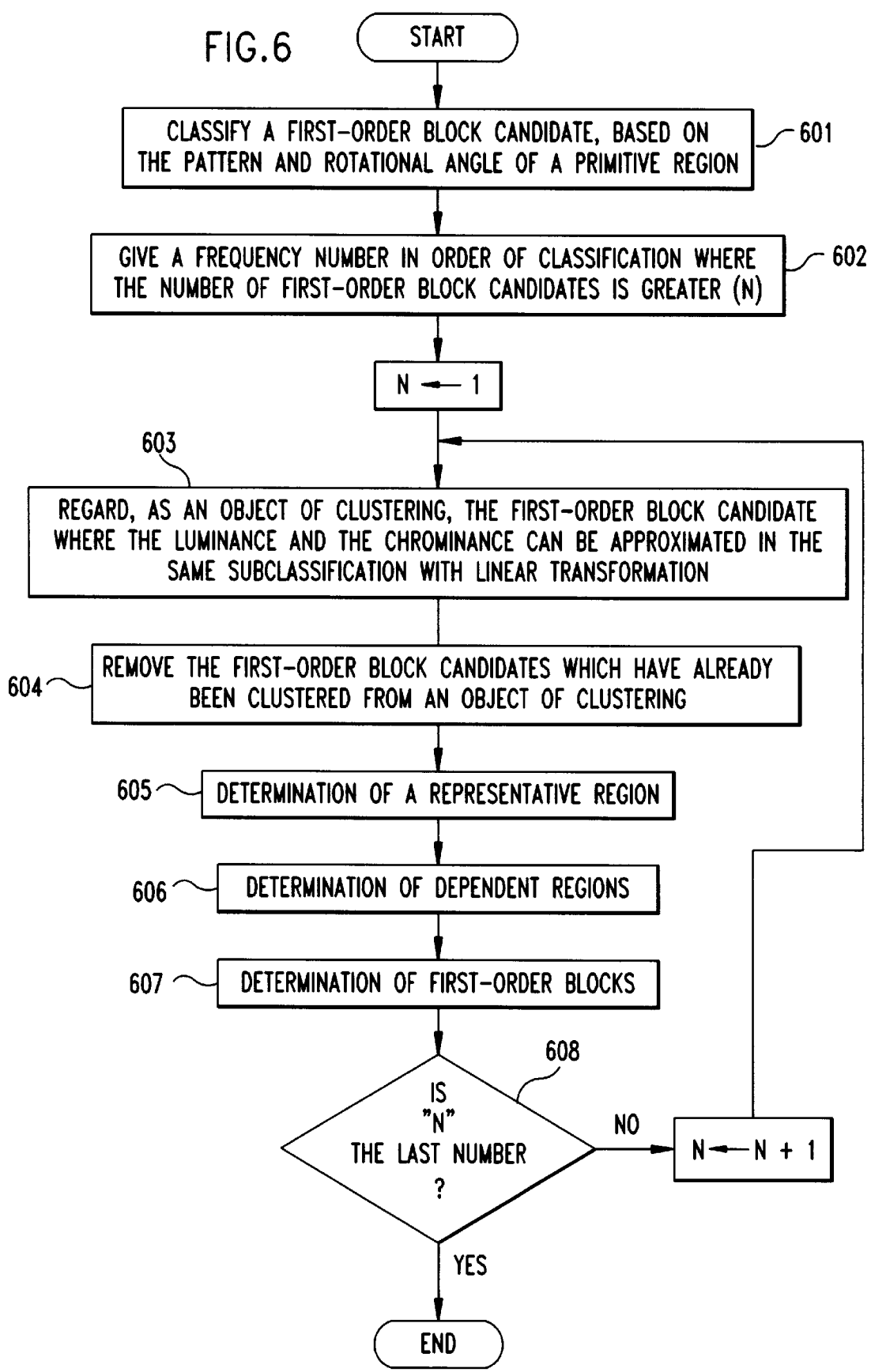

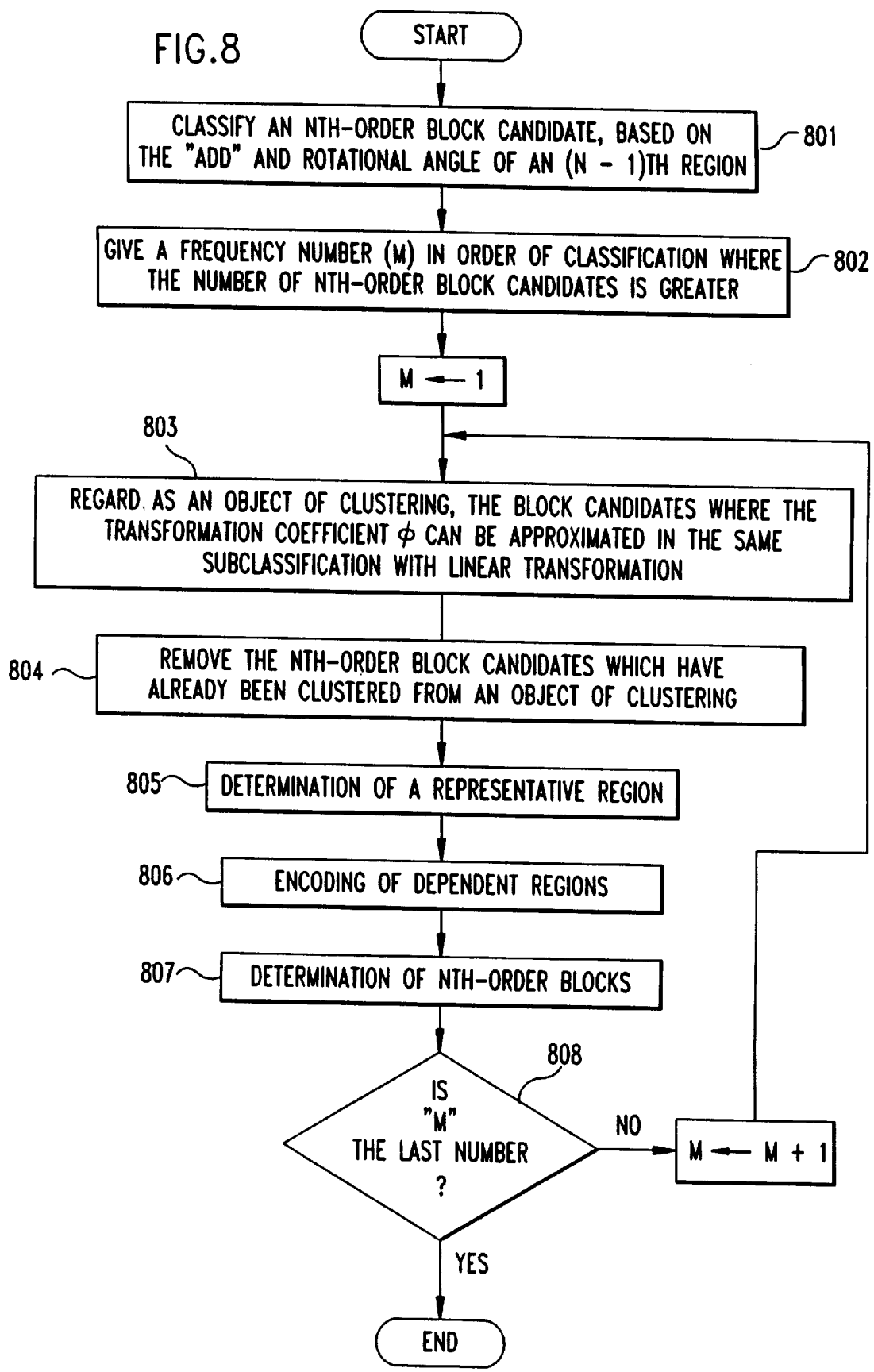

METHOD OF AND SYSTEM FOR ENCODING DIGITAL IMAGES

FIELD OF THE INVENTION

The present invention relates to a method of processing a digital image, and more particularly to an image compressing method based on vector quantization.

RELATED ART

With the ever increasing popularity of multimedia, there is an increasing demand for a high accurate image processing technique having the same quality as original printing or photography. The image data is massive in data quantity compared with speech data, etc., and as the image becomes more accurate, the data quantity is exponentially increased. Therefore, the data compression of image data is indispensable in the image processing arts.

An image compressing method based on vector quantization is known as one of data compressing methods making use of spatial redundancy. The vector quantization is a technique where a finite number of patterns of the representative quantization vectors are prepared, a quantization vector most similar to an input vector is selected, and the number of the selected vector is coded. This method is effective when quantization is desired to be performed at a relatively low bite rate.

While a wide variety of methods have been proposed for the vector quantization, orthogonal transformation vector quantization is known as a most general method. In this method, orthogonal transformation coefficients having a dispersion of the same degree are merged into a single vector, the orthogonal transformation coefficients in a block are classified into a plurality of vectors, and each of the classified vectors is vector-quantized with a code book. Specifically, discrete cosine transformation, kernel level transformation, etc., are known.

A conventional band compression method utilizing orthogonal transformation such as this is disclosed, for example, Published Unexamined Patent Application No. 3-123176. In this method, an image is segmented into a plurality of square blocks, band compression based on orthogonal transformation is performed in order to compress data, and each block is quantized and coded. In addition, a great number of conventional band compression methods, based on orthogonal transformation, have been proposed as shown in Published Unexamined Japanese Patent Application No. 3-22674 and Published Unexamined Japanese Patent Application No. 7-38761.

However, if, in a transformation such as this, a high-frequency component is cut out for data compression, then so-called mosquito noise will occur around an edge which is high-frequency information of an image. In addition, there is the problem that block artifacts easily occur, because transformation is performed for each block and therefore a slight difference between neighboring blocks is emphasized at a boundary line by the human visual characteristic.

Further, a conventional technique using a multistage image compressing method is disclosed Published Unexamined Japanese Patent Application No. 61-263369. In this method, an image is segmented into blocks, an average value of pixels in the block is computed, and a first stage compression is performed. Then, a second stage compression and the subsequent compression are repeated based on the average value of the first stage compression. Specifically, a difference between the average value and the number of pixels is computed, and a residual image in each layer is coded with Huffman code to compress data.

Furthermore, Published Unexamined Japanese Patent Application No. 62-289079 discloses a conventional image compressing method. In this method, basic patterns are registered using a matrix where a threshold value has been set for each pixel. An image is segmented into small blocks having the same size as the matrix, the small block is compared with the basic patterns in order to obtain the most similar basic pattern, and a residual image separating a differential portion is obtained.

As described above, in the conventional method using orthogonal transformation, if a high-frequency component is cut out for data compression, then noise will easily occur around an edge which is high-frequency information of an image. In addition, there is the problem that block artifacts easily occur, because transformation is performed for each block and therefore a slight difference between neighboring blocks is emphasized at a boundary line by the human visual characteristic.

SUMMARY OF THE INVENTION

Accordingly, an objective of the present invention is to efficiently store edge information which is sensitive to a visual characteristic.

Another objective of the present invention is to reduce block artifacts which are viewed in the form of a tile at a flat region.

Still another objective of the present invention is to provide a novel data compressing method which is capable of high efficient compression.

To achieve the foregoing objects and in accordance with an important aspect of the present invention, there is provided a method of encoding a digital image, comprising the steps of:

(a) segmenting said digital image into a plurality of primitive regions and computing for each said primitive region, parameters about the luminance and chrominances of the primitive region thereof;

(b) merging said plurality of primitive regions to generate first-order block candidates;

(c) classifying said first-order block candidate into corresponding one of predetermined patterns;

(d) clustering, as a first-order block, the first-order block candidates which belong to the same classification, and parameters about the luminance and chrominances of said primitive regions in which can be approximated by linear transformation, and representing transformation coefficients of said linear transformation as parameters;

(e) merging said plurality of first-order blocks to generate second-order block candidates;

(f) classifying said second-order block candidate by a pattern of each said first-order block constituting said second-order block candidate;

(g) clustering, as a second-order block, said second-order block candidates which belong is to the same classification, and transformation coefficients of said first-order blocks in which can be approximated with linear transformation, and representing the transformation coefficient of said linear transformation as parameters;

(h) recursively executing steps (e) through (g) while raising the order of the block in sequence until the clustering of the blocks becomes impossible; and (i) encoding the parameters of the coexisting multi-order blocks.

The aforementioned step (a) may further include classifying each of said plurality of primitive regions into any one of a plurality of primitive region patterns.

In addition, it is preferable that the plurality of primitive region patterns be defined in accordance with existence of a change of a plurality of pixels constituting said primitive regions.

The aforementioned step (c) may classify the first-order block candidate into any one of predetermined patterns, based on said primitive region pattern of said primitive region constituting said first-order block candidate and on rotational angle corresponding to said primitive region pattern.

The aforementioned step (b), said first-order blocks adjacent to one another may be disposed so as to overlap one another.

In the aforementioned step (d), the meaning that "the transformation coefficients of said first-order blocks thereof can be approximated with linear transformation" means a case where the error is less than a predetermined threshold value, when the parameters about the luminance and the chrominances of one of said first-order block candidates are approximated with those of another first-order block candidate, shifted and multiplied by fixed quantities.

The clustering in the aforementioned step (d) may be performed in order of classification where the number of the classified first-order block candidates is greater.

In the step (d), any of the first-order blocks clustered to the same pattern may be selected as a representative region, parameters about the address, luminance, and chrominances of said representative region are stored, and the remaining first-order blocks may be coded with transformation coefficients of a rotational angle, a luminance, and chrominances based on said representative region.

In the classification of the second-order block candidates in said step (f), it is also possible that said second-order block candidate is classified into any one of predetermined patterns, based on said representative region constituting said first-order blocks of each said second-order block candidate and on said transformation coefficients.

In the aforementioned step (g), the transformation coefficients of said first-order blocks constituting one of said second-order block candidates may be approximated by linear transformation in a case where the error with the transformation coefficient in another second-order block candidate is less than a predetermined threshold value, when said transformation coefficients are approximated with shifted and multiplied by fixed quantities.

In accordance with another important aspect of the present invention, there is provided a method of encoding a digital image, comprising the steps of: (a) segmenting said digital image into a plurality of primitive regions; (b) classifying said primitive region into corresponding one of predetermined patterns, and computing for each said primitive region, a parameter about the classified pattern and parameters about the luminance and the chrominances of the primitive region; (c) merging said plurality of primitive regions to generate first-order block candidates; (d) classifying each of said first-order block candidate by the parameters about the classified pattern of said primitive region constituting the first-order block candidate; and (e) clustering, as a first-order block, said first-order block candidates which belong to the same classification, the parameters about the luminance and chrominances of said primitive regions in which can be approximated by linear transformation, and representing transformation coefficients of said linear transformation as parameters.

It is preferable in the aforementioned method that the patterns be defined in accordance with the existence of a change of a plurality of pixels constituting said primitive regions.

In addition, the step (d) may classify the first-order block candidate, based on said primitive region patterns of said primitive regions constituting said first-order block candidate and on rotational angles corresponding to said pattern.

In the aforementioned step (c) the first-order blocks adjacent to one another may be disposed so as to overlap one another.

In the aforementioned step (e), the approximation in the linear transformation may be a case where the error is less than a predetermined threshold value, when the parameters about the luminance and the chrominances of one of said first-order block candidates are approximated by those of another first-order block candidate, shifted and multiplied by fixed quantities.

The aforementioned clustering in the step (e) may be performed in order of classification where the number of the classified first-order block candidates is greater.

In accordance with still another important aspect of the present invention, there is provided a system for encoding a digital image, comprising: image input means for inputting said digital image; means for segmenting said digital image into a plurality of primitive regions and computing for each said primitive region, parameters about the luminance and chrominances of the primitive region; means for merging said plurality of primitive regions to generate first-order block candidates and classifying each of said first-order block candidates into any one of a plurality of predetermined patterns; means for clustering, as a first order block, the first-order block candidates which belong to the same classification, and the parameters about the luminance and chrominances of said primitive region in which can be approximated by linear transformation, and representing transformation coefficients of said linear transformation as parameters; means for merging a plurality of the first-order blocks to generate second-order block candidates and classifying the second-order block candidate in accordance with a pattern of each said first-order blocks constituting said second-order block candidate; means for clustering, as a second-order block, the second-order block candidates which belong and to the same classification, and the transformation coefficients of said first-order blocks in which can be approximated by linear transformation, and representing a transformation coefficient of said linear transformation as parameters; control means for recursively executing steps (e) and (g) while raising the order of the block in sequence until the clustering of the blocks becomes impossible; and means for encoding the parameters of the coexisting multi-order blocks.

In accordance with a further important aspect of the present invention, there is provided a system for encoding a digital image, comprising: image input means for inputting said digital image; means for segmenting said digital image into a plurality of primitive regions and computing for each said primitive region, parameters about the luminance and the chrominances of the primitive region; means for merging said plurality of primitive regions to generate first-order block candidates and classifying said first-order block candidate into corresponding one of predetermined patterns; and means for clustering, as a first-order block the first-order block candidates which belong to the same classification, and the parameters about the luminance and chrominances of said primitive region in which can be approximated by linear transformation, and representing transformation coefficients of said linear transformation as parameters.

BRIEF DESCRIPTION OF THE DRAWINGS

FIG. 2 is a diagram showing patterns with which a primitive region is classified.

FIG. 3 is a diagram showing a first-order block candidate RB generated by merging 4 neighboring primitive regions PR.

FIG. 5 is a diagram showing a frequency table used in step 103.

FIG. 6 is a diagram showing a flowchart used to explain step 103 in detail.

FIG. 7 is a diagram showing a second-order block candidate.

FIG. 8 is a diagram showing a flowchart used to explain step 105 in detail.

DESCRIPTION OF THE PREFERRED EMBODIMENTS

Figure 1:
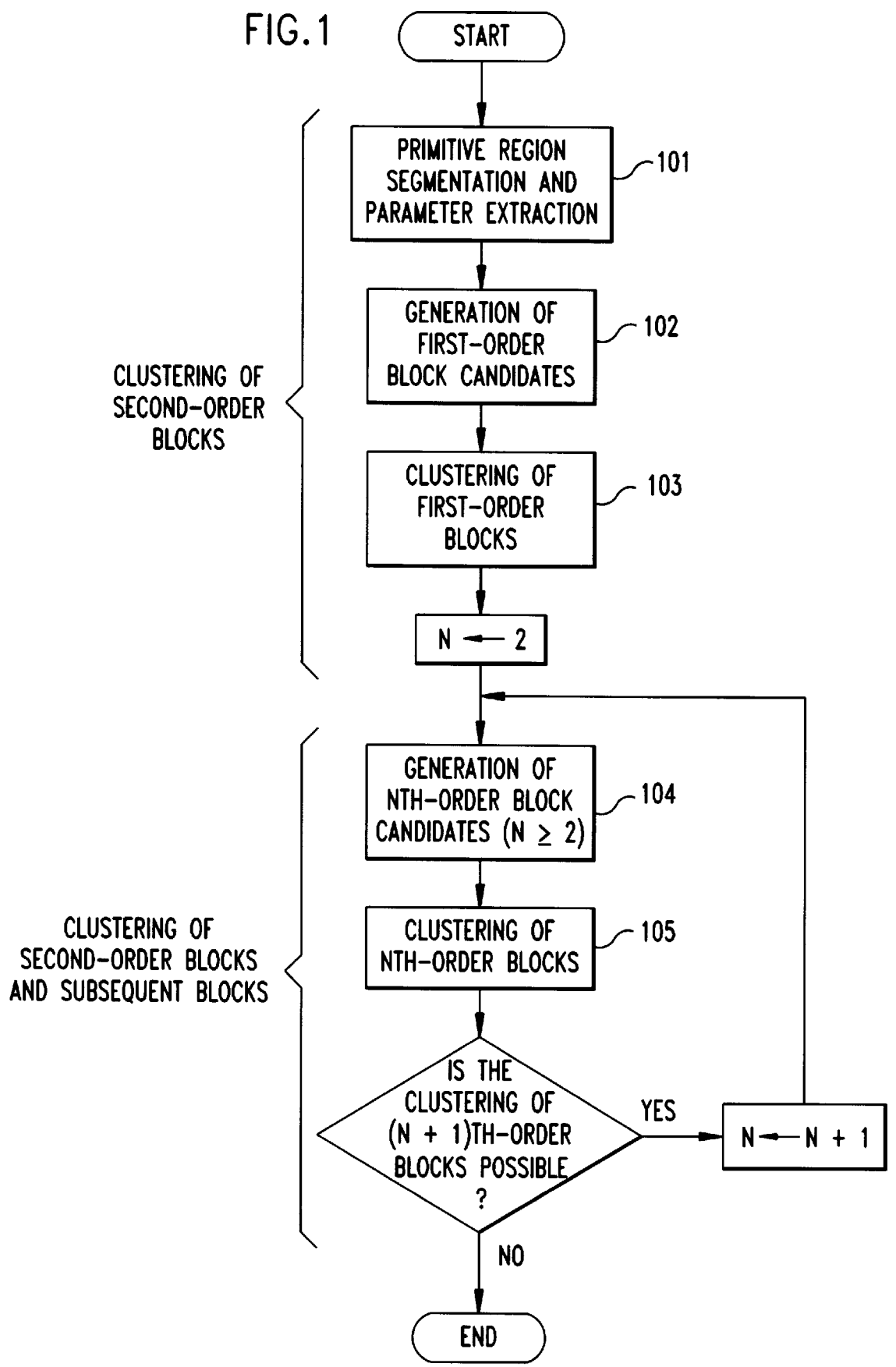
FIG. 1 is a flowchart showing an embodiment of the present invention.

FIG. 1 is a flowchart showing a preferred embodiment of the present invention. The flowchart consists of the clustering of first-order blocks and the clustering of second-order blocks and subsequent blocks. The flow will hereinafter be described along this flowchart.

Primitive Region Segmentation and Parameter Extraction (step 101):

A primitive region with a certain predetermined size is defined and an image is segmented into a plurality of primitive regions. This primitive region may be any size. In the present embodiment, one primitive region is defined as consisting of a 2×2 array of 4 neighboring pixels (see FIG. 2).

The primitive region thus defined has the following parameters, which will hereinafter be described.

Parameters of the primitive region:
Pattern: PAT
Rotational angle: θ
Average luminance in a white region: Y
Average chrominance in a white region: Cb, Cr
Differential luminance in a black region: y
Differential chrominance in a black region: cb, cr Pattern PAT:

The pattern PAT is a parameter that indicates which pattern a primitive region is classified among predetermined patterns. First, each of the primitive regions can be classified as a region having a corner, including a flat and an edge. For example, the primitive region of a region where the luminance thereof slowly varies can be approximated as a flat region. The region where the luminance thereof abruptly varies can be considered to be the same as the roof edge of an edge region. Furthermore, a region partially including an oblique edge region can be considered to be the same as a region including part of a corner. Therefore, the primitive region consisting of 2×2 pixels (4 pixels) is classified into any of 4 patterns A to D such as those shown in FIG. 2. The black and the white in the pattern, shown in FIG. 2, indicate the existence of a change.

That is, the pattern A is a pattern where 4 pixels do not change. The pattern B is a pattern where 2 pixels in the column or row change. The pattern C is a pattern where only one of 4 pixels changes. The pattern D is a pattern where 2 diagonal pixels change. Note that, for the pattern D, a pattern such as this does not occur in a normal image, but it is provided in consideration of the point that there is the possibility that it very rarely occurs because of the influence of noise. Therefore, the primitive region has a parameter concerning the pattern (PAT=A, B, C, or D), with the result that the primitive region is classified into any of the patterns.

Rotational angle θ:

This is a parameter that indicates to what degree a primitive region is rotated, based on the classified pattern. For example, in the case where only 1 pixel on the upper right changes in the primitive region, the primitive region can be correlated by rotating the pattern C by 90 degrees. If the pattern is allowed to be rotated in intervals of 90 degrees and a parameter regarding the rotational angle is defined, then all primitive regions will be represented by two parameters, the classification pattern (PAT) and the rotational angle (θ). Because there is a pattern which would not change even if it were rotated in 4 directions in every 90°, the primitive region can be classified into one of the 8 following classifications.

Classification 1: PAT=A, θ=X (remain unchanged even if rotated)
Classification 2: PAT=B, θ=0
Classification 3: PAT=B, θ=90
Classification 4: PAT=C, θ=0
Classification 5: PAT=C, θ=90
Classification 6: PAT=C, θ=180
Classification 7: PAT=C, θ=270
Classification 8: PAT=D, θ=X (remain unchanged even if rotated)

Luminance and chrominance (Y, Cb, Cr, y, cb, cr):

In the case where the respective pixels are represented with a luminance signal and two chrominance signals, the information about the luminance and chrominances in the primitive region is represented with the average luminance (Y) and average chrominance (Cb, Cr) in the white region of the pattern, the differential value (y) in the black region between the average luminance of the black region and the average luminance of the white region, and the differential value (cb, cr) in the black region between the average chrominance of the black region and the average chrominance of the white region.

Generation of First-Order Block Candidates (Step 102)

Neighboring primitive regions are merged to generate a first-order block candidate. In the embodiment of the present invention, 2×2 neighboring primitive regions are merged to generate a first-order block candidate. FIG. 3 illustrates a first-order block candidate RB generated by merging neighboring primitive regions PR. In FIG. 3 a single first-order block candidate $RB_1$ is formed with primitive regions $PR_1$, $PR_4$, $PR_5$, and $PR_2$. The other first-order candidates are formed in the same way. The reason that adjacent first-order block candidates are disposed so as to overlap one another, as shown in FIG. 3, is for making high-efficient compression possible. But, in the present invention it is also possible to dispose the first-order block candidates so as not to overlap one another.

Clustering of First-Order Block Candidates (Step 103)

The first-order block candidates generated in step 102 are clustered. For this clustering, the first-order block candidates, which become an object of comparison, need to be in a relationship meeting the two following conditions.

Condition 1:

The parameters regarding the pattern and rotational angle of the primitive region are equivalent between the first-order block candidates.

Condition 2:

For the parameters regarding the luminance and chrominance, the approximation of the parameters is possible with linear transformation.

Figure 4A:
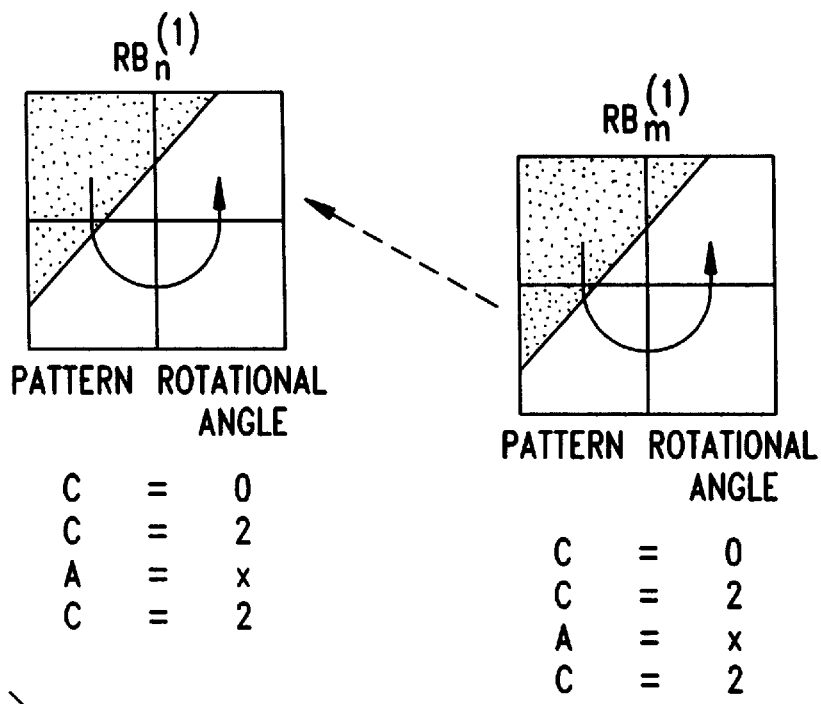
FIG. 4(a) illustrates first-order block candidates of the same pattern and rotational angle.
Figure 4B:
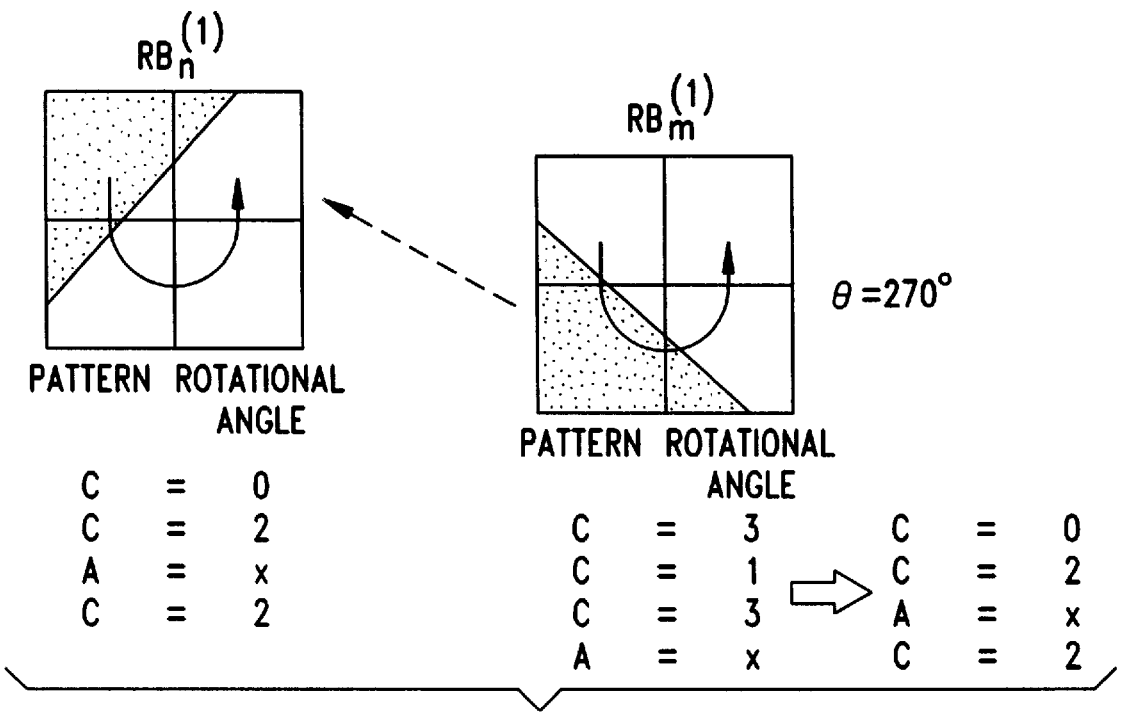
FIG. 4(b) illustrates equivalent first order block candidates.

As to condition 1:

It is necessary that, in respective first-order block candidates, the primitive regions with the same pattern (PAT) and the same rotation angle (θ) are likewise disposed. This may include the case where a first-order block candidate becomes the same by rotating the first-order block candidate itself. FIG. 4 illustrates an example of the case where two first-order block candidates are equivalent to each other. FIG. 4(a) illustrates the case where first-order block candidates $RB_n$ and $RB_m$ are the same in pattern and rotational angle, as well as in block position. Also, FIG. 4(b) illustrates the case where the first-order block candidate $RB_m$ becomes equivalent to the first-order block candidate $RB_n$ by rotating the first-order block candidate $RB_m$ itself in the counterclockwise direction by $θ^{(1)}=270°$. In the latter example, i.e., in the case where the block candidate itself is rotated, it is necessary that attention is paid to the fact that the rotational angle (θ) of the primitive region also changes as follows. Note that when a block candidate itself is rotated, the rotational angle ($θ^{(1)}$) of the block candidate is stored.

$$[(C-3), (C-1), (C-3), (A-x)] = [(C-0), (C-2), (A-x), (C-2)](θ=3)$$ [Equation 1]

where [0, 0, 0, 0] represents [(upper left pattern (PTA)–rotational angle (θ)), (lower left pattern (PTA)–rotational angle (θ)), (lower right pattern (PTA)–rotational angle (θ)), (upper right pattern (PTA)–rotational angle (θ))], and 0, 1, 2, and 3 represent 0°, 90°, 180°, and 270°, respectively.

As to condition 2:

The meaning that approximation is possible with linear transformation is that the error is less than a predetermined threshold value, when the luminance and the chrominances of element of a certain first-order block candidate are approximated with the values that those of another first-order block are multiplied and shifted by fixed quantities (a) and (b). That is, there is the following relationship.

$$X \doteq aX' + b$$ [Equation 2]

where X represents the vector of the luminance and chrominances of each of the 4 primitive regions of a certain first-order block candidate, X' represents the vector of the luminance and chrominances of each of the 4 primitive regions of another first-order block candidate, and "a" and "b" represent a scaler value.

For a group of first-order block candidates such as to meet the aforementioned two conditions, any one of the blocks is considered to be the representative block region and the remaining blocks are considered to be the dependent regions. The elements (luminance and chrominances) of the primitive regions of the representative region are stored, but those of the dependent regions are deleted. Then, (i) the address (ADD) of the representative region, (ii) the rotational angle (θ) based on the representative region, and (iii) the coefficients transformed the luminance and chrominance approximately to the representative region are stored.

The grouping of the first-order blocks in step 103 will be described in further detail in reference to FIGS. 5 and 6. FIG. 5 illustrates a frequency table used in step 103, while FIG. 6 is a flowchart used to explain step 103 in detail. The reason that a frequency table such as this is used is that high compression will become possible if first-order block candidates are clustered in order of higher frequency.

Classify First-Order Block Candidates in Accordance With The Patterns and Rotational Angles of The Primitive Regions (Step 601)

For the frequency table shown in FIG. 5, first the first-order block candidates are classified into 64 patterns in accordance with the patterns (PAT) of the primitive regions and then are subclassified in accordance with the rotational angles (θ) of the primitive regions. According to the classifications, the first-order block candidates are all classified. The reason that the first-order block candidates can be classified into 64 patterns is that some of the first-order block candidates can be considered to be in the same classification by rotating the first-order block candidate itself. Note that, when the first-order block candidate itself is rotated, the rotational angle ($θ^1$) is described.

Give a Frequency Number N in Order of Classification Where the Number of First-Order Block Candidates is Greater (Step 602)

In this embodiment, a frequency number is given from 1 up to 64 in order of classification where the number of first-order block candidates is greater. Then, the following steps will be executed in order from frequency number 1. The reason that the first-order block candidates are thus clustered in order of higher frequency is for performing more efficient compression.

Regard, as an object of clustering, the first-order block candidate where the luminance and the chrominance can be approximated in the same subclassification by linear transformation (step 603):

Only the first-order block candidate, which is judged with the aforementioned condition 2 and meets the condition 2 in the same subclassification, becomes an object of grouping. For the first-order block candidate which becomes an object of grouping, the aforementioned transformation coefficients ("a" and "b") are stored. The first-order block candidate which does not meet the condition 2 is segmented into primitive regions.

Remove the first-order block candidates which have already been clustered from an object of clustering (step 604):

Note that, when N=1, such first-order block candidates do not exist because clustering has not been performed yet.

Determination of a representative region (step 605):

For the block candidates which became in step 604 an object of clustering, any one of them is determined as a representative region and the remaining block candidates are determined as dependent regions. The representative region is referred to as a block candidate where the difference between the representative block candidate and the respective block candidates becomes smallest when the block candidate is represented with linear transformation. Specifically, if the luminance and the chrominances of the pixels regions of a certain block candidate and those of another block candidates are approximated with the linear transformation there will be obtained a block candidate where the sum, obtained by adding the square of an error between the certain block candidate and an approximatable block candidate, becomes minimum. This block candidate is determined as a representative region. For the first-order block candidate of the representative region, the elements (Y, Cb, Cr, y, cbl, and cr) relating to the luminance and chrominances of the 4 primitive regions of the first-order block candidate are held.

Determination of dependent regions (step 606):

The elements relating to the luminance and chrominances that the dependent region itself has are deleted. For the dependent region, the address of the representative region (ADD), the rotational angle ($\theta^1$) based on the representative region, and the transformation coefficients ("a" and "b") of the luminance and chrominance based on the representative region are stored.

Determination of first-order blocks (step 607):

When generating the first-order block candidates, they are allowed to overlap one another, but when determining first-order blocks, they are disposed so as not to overlap one another. This step can be executed between step 604 and step 605. Note that the first-order block candidate may be disposed so as not to overlap one another from the gist of the present invention. In such a case, the step may be omitted.

Execute steps 603 to 607 in order of frequency number (step 608):

When the frequency number reaches the last number or the number of block candidates is less than or equal to 1, the clustering of the first-order block candidates in step 103 is ended.

Generation of Nth-order block candidates (step 104):

The clustering of Nth-order block candidates (N≧2) is recursively repeated by step 104 and step 105. Since the procedure is the same as the clustering of the second-order block candidates, the clustering of the second-order block candidates will hereinafter be described as an example. First, neighboring first-order blocks are merged to generate a second-order block candidate. In this embodiment, as with step 102, 2×2 first-order blocks are merged to generate a second-order block candidate. But, when 2×2 neighboring first-order blocks do not exist, it is necessary that attention is paid to the fact that a second-order block candidate is not generated. In addition, as with the generation of the first-order block candidates, the second-order block candidates are allowed to overlap one another.

FIG. 7 illustrates the second-order block candidate. The respective first-order blocks of the second-order block candidate have the address ADD, rotational angle $\theta$, and transformation coefficient $\Phi$ (a, b) of the representative region.

Clustering of Nth-order blocks (step 105):

The second-order block candidates generated in step 104 are clustered. In general, for the clustering of Nth-order blocks, the Nth-order block candidates, which become an object of comparison, need to be in a relationship meeting the two following conditions.

Condition 1:

The parameters regarding the address (ADD) and rotational angle ($\theta^{N-1}$) of the (N−1)th-order representative region are equivalent between the Nth-order block candidates.

Condition 2:

For the transformation coefficient $\Phi$ (=a, b) obtained in the clustering of the (N−1)th-order blocks, the approximation of the transformation coefficient is possible with linear transformation.

As to condition 1:

This condition 1 is substantially identical with the condition 1 of the clustering of the first-order blocks, except that the pattern of the primitive region of the condition 1 is replaced with the address (ADD) of the representative region. In addition, as with the clustering of the first-order blocks, the Nth-order block candidate itself may be rotated in 4 directions.

As to condition 2:

The meaning that approximation is possible with linear transformation is referred to in the following case.

$$\Phi^{(2)} \cdot \Phi^{(1)} \rightarrow \Phi^{(1)'}(a^2,b^2) \cdot ((a,b),(a,b),(a,b),(a,b))^{(1)} \rightarrow ((a,b),(a,b),(a,b),(a,b))^{(1)'}$$
[Equation 3]

where $\Phi^{(2)}$ represents the transformation coefficient vector of the clustering of the second-order blocks and $\Phi^{(1)}$ represents the transformation coefficient vector already obtained in the clustering of the first-order blocks.

That is, when the transformation coefficient in each of the first-order blocks of a certain second-order block candidate is approximated with a fixed quantity which is shifted (b) and multiplied (a), the error with the transformation coefficient in another second-order block candidate is less than a predetermined threshold value.

Step 105 uses what is similar to the frequency table used in step 103 and is performed in a procedure similar to step 103. A frequency table used in this step is substantially identical with the frequency table of FIG. 5 except that the pattern of the block candidate is replaced with the address of the representative region. In addition, step 105 is executed along a flowchart of FIG. 8 instead of the flowchart of FIG. 6. The basic procedure is substantially the same as step 103 except that parameters used are different.

What is an important point, here, is that the clustering of the second-order blocks is performed not based on parameters such as the luminance and chrominance of the primitive region, but based on the address (ADD$^{(1)}$) of the first-order representative region and the rotational angle ($\theta^{(1)}$) corresponding to the representative region. By clustering the second-order blocks in accordance with the address (ADD$^{(1)}$) and the rotational angle ($\theta^{(1)}$), there are obtained new parameters, that is, the address (ADD$^{(2)}$) of the second-order representative region, the rotational angle ($\theta^{(2)}$) corresponding to the second-order representative region, and the second-order transformation coefficient $\Phi^{(2)}$.

Execute steps 104 and 105 recursively:

A sequence of steps for clustering second-order blocks is repeated up to the Nth-order to obtain the address (ADD$^{(N)}$) of the Nth-order representative region, the rotational angle ($\theta^{(N)}$) corresponding to the Nth-order representative region, and the Nth-order transformation coefficient $\Phi^{(N)}$. This clustering is executed until the clustering of (N+1)th-order blocks becomes impossible.

Figure 9:
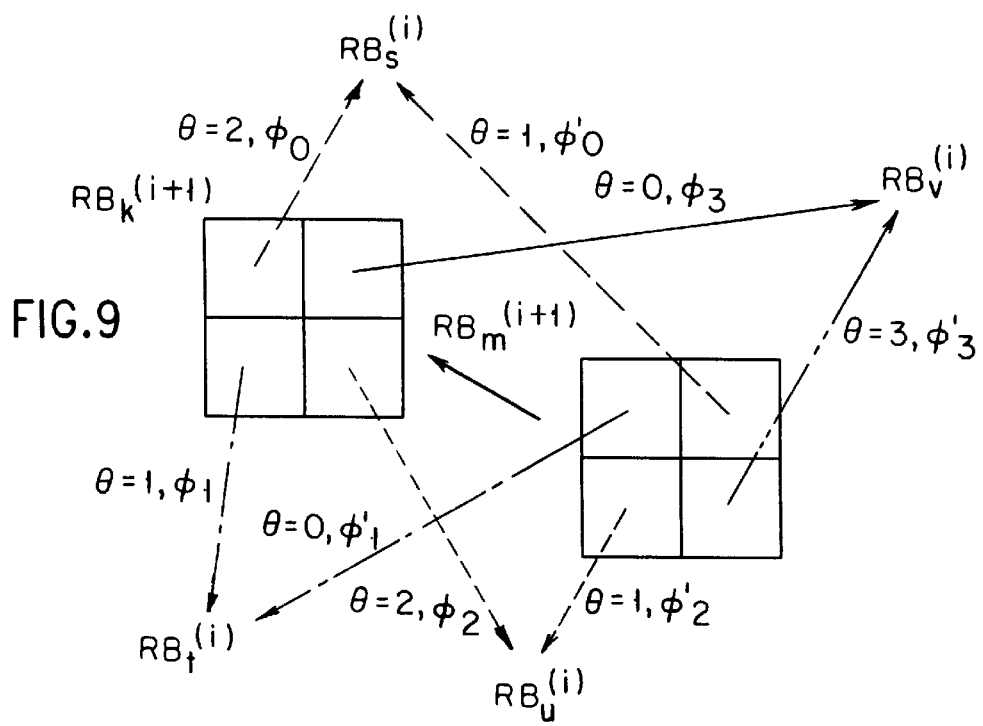
FIG. 9 is a state diagram showing the clustering of (N+1)th-order blocks.

FIG. 9 is a state diagram showing the clustering of (i+1)th-order blocks. In FIG. 9 the clustering of (i+1)th-order blocks is performed. For the ith-order block which is the element of the (i+1)th-order block, $RB_s^{(i)}$, $RB_t^{(i)}$, $RB_u^{(i)}$, and $RB_v^{(i)}$ are the representative region and the rotational angles are different. However, if the (i+1)th-order block is rotated, not only will the arrangement of the (i+1)th-order block which is the element of the ith-order block become the same, but also the parameter of the rotational angle will be converted and become equal with the rotation. In the case where a linear transformation coefficient $\Phi^{(i+1)}$ exists, if $RB_k^{(i+1)}$ is the representative region of the (i+1)th-order block, $RB_m^{(i+1)}$ will be represented with the address of $RB_k^{(i+1)}$, the rotational angle ($\theta=90$), and the transformation coefficients $\Phi^{(i+1)}$ of the luminance and the chrominance. As a result, in the nth-order block, square regions consisting of $2^n \times 2^n$ primitive regions, i.e., $2^{n+1} \times 2^{n+1}$ pixels are merged.

Figure 10:
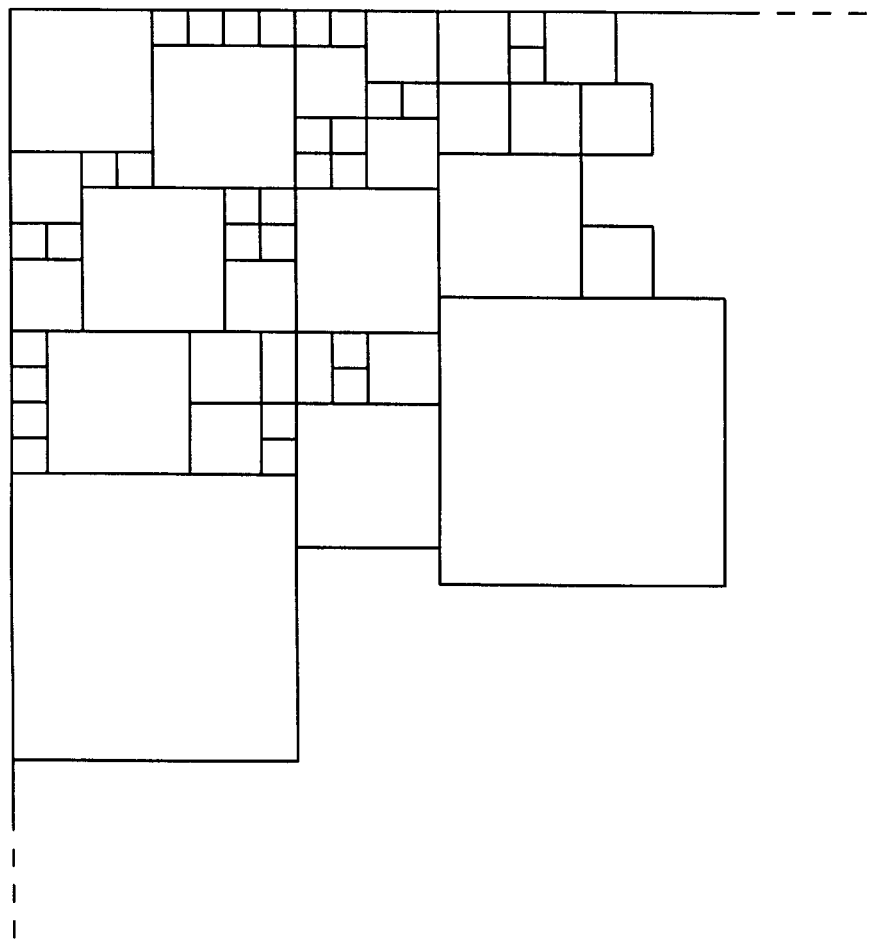
FIG. 10 is a diagram illustrating the structure of the coded area of an image.

FIG. 10 illustrates the structure of the coded area of an image. In this embodiment the coded image is represented by the coexistence of the primitive regions and the first-order to nth-order blocks, as shown in FIG. 10. For the nth-order block, in the regions other than the representative regions, i.e., in the dependent regions, the representative regions are represented with large blocks. On the other hand, in the representative regions, the blocks in the segmented lower-ranking regions represent representative regions, respectively.

In this way, an image, comprised of high-order blocks consisting of a plurality of first-order to nth-order blocks and primitive regions, is coded.

Figure 11:
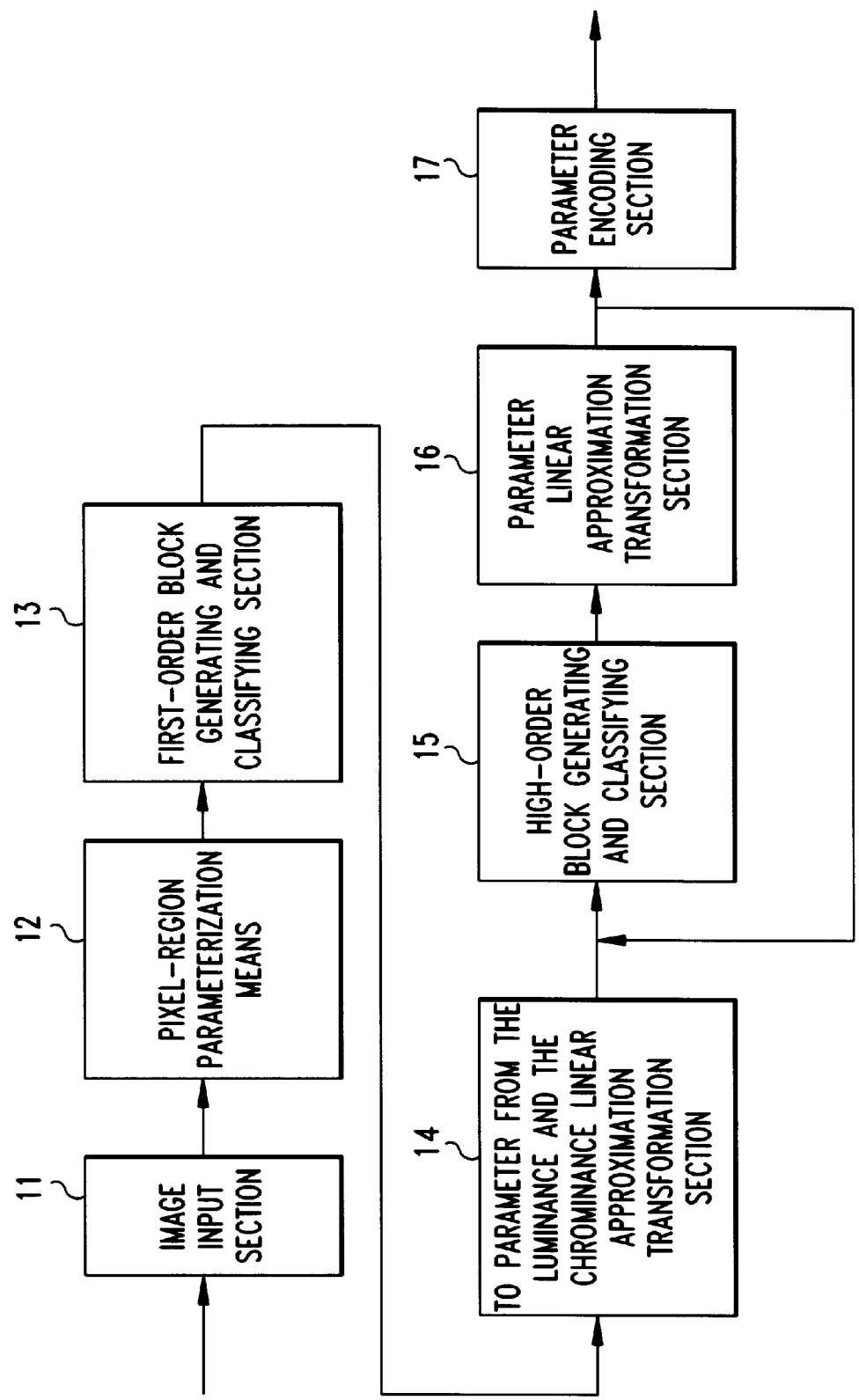
FIG. 11 is a block diagram showing an encoding system of an embodiment of the present invention.

FIG. 11 is a block diagram showing a digital image encoding system of an embodiment of the present invention. First, data about a digital image is input to an image input section 11. Then, by parameterization means 12, this image is segmented into a plurality of primitive regions, and also parameters about the luminance and chrominances of the primitive region are obtained for each primitive region. Then, by generation-classification means 13, a plurality of primitive regions are merged to generate a first-order block candidate, and the first-order block candidate is classified into any one of predetermined patterns. Next, among the first-order block candidates belonging to the same classification, the first-order block candidates, where the parameters about the luminance and chrominances of the primitive regions thereof can be approximated with linear transformation, are clustered as a first-order block by a linear-approximation transformation section 14, and the transformation coefficients of the linear transformation are represented with parameters.

By a high-order block generation-classification section 15, a plurality of first-order blocks are merged to generate a second-order block candidate, and the second-order block candidate is classified according to the patterns of the first blocks of the second-order block candidate. Then, among the second-order block candidates belonging to the same classification, the second-order block candidates, where the transformation coefficients of the first blocks thereof can be approximated with linear transformation, are clustered as a second-order block by a linear-approximation transformation section 16, and the transformation coefficient of the linear transformation is represented with a parameter.

Until the clustering of the blocks becomes impossible, the order of the block is raised in sequence and the clustering is recursively executed, by control means (not shown). Then, the parameters of the coexisting multi-order blocks are coded and output by an encoding section 17.

The aforementioned system is a system for achieving the encoding method of the present embodiment, so the description of the aforementioned encoding method applies to a description of the operation and function of the present system.

In accordance with the embodiment of the present invention, the information about the luminance and the chrominances, which is greater in quantity, is stored only in the primitive regions which are very small in number compared with the entire image, and the data of the first-order or more blocks is not stored directly. In practice, for the first-order or more blocks, only the address, rotational angles, and linear transformation coefficients of the representative region are stored. Therefore, data compression becomes possible with high efficiency.

While the encoding method has been described in the aforementioned embodiment, the similar procedure can be applied also with a decoding method. Specifically, what actual image data (luminance signal and chrominance signal) has are only primitive regions, and therefore, the data, including data of the primitive regions which have not been clustered, is decoded to image data. As this occurs, the image data of the representative region of the first-order block is also decoded. Then, the dependent regions of the first-order block are decoded as image data. As this occurs, the representative region of the second-order block is also decoded. Then, the dependent regions of the second-order block are decoded. By repeatedly executing this procedure up to the nth-order block, the entire image can be decoded.

As has been described, in the present invention the high efficient compression of an image becomes possible with simple transformation. In addition, based on the existence of a change, the primitive regions are classified in this embodiment into predetermined patterns. Accordingly, edge information which is sensitive to a visual characteristic can be efficiently stored without making the information dull. Furthermore, the region blocks in the embodiment of the present invention are different in size, depending upon the degree of similarity. Accordingly, block artifacts, where a difference between neighboring blocks is emphasized at a boundary line by the human visual characteristic, can be made inconspicuous.

We claim:

1. A method of encoding a digital image, comprising the steps of:
   (a) segmenting said digital image into a plurality of primitive regions and computing for each said primitive region, parameters about the luminance and chrominances of the primitive region thereof;
   (b) merging said plurality of primitive regions to generate first-order block candidates;
   (c) classifying said first-order block candidate into corresponding one of predetermined patterns;
   (d) clustering, as a first-order block, the first-order block candidates which belong to the same classification, and parameters about the luminance and chrominances of said primitive regions in which can be approximated by linear transformation, and representing transformation coefficients of said linear transformation as parameters;
   (e) merging said plurality of first-order blocks to generate second-order block candidates;
   (f) classifying said second-order block candidate by a pattern of each said first-order block constituting said second-order block candidate;
   (g) clustering, as a second-order block, said second-order block candidates which belong to the same classification, and transformation coefficients of said first-order blocks in which can be approximated with linear transformation, and representing the transformation coefficient of said linear transformation as parameters;
   (h) recursively executing steps (e) through (g) while raising the order of the block in sequence until the clustering of the blocks becomes impossible; and
   (i) encoding the parameters of the coexisting multi-order blocks.

2. The method as set forth in claim 1, wherein said step (a) further includes classifying each of said plurality of primitive regions into any one of a plurality of primitive region patterns.

3. The method as set forth in claim 2, wherein said plurality of primitive region patterns are defined in accordance with existence of a change of a plurality of pixels constituting said primitive regions.

4. The method as set forth in claim 2, wherein said step (c) classifies said first-order block candidate into any one of predetermined patterns, based on said primitive region pattern of each said primitive region constituting said first-order block candidate and on rotational angle corresponding to said primitive region pattern.

5. The method as set forth in claim 1, wherein in said step (b), said first-order blocks adjacent to one another are disposed so as to overlap one another.

6. The method as set forth in claim 1, wherein, in said step (d), the meaning that "the transformation coefficients of said first-order blocks thereof can be approximated with linear transformation" means a case where the error is less than a predetermined threshold value, when the parameters about the luminance and the chrominances of one of said first-order block candidates are approximated with those of another first-order block candidate, shifted and multiplied by fixed quantities.

7. The method as set forth in claim 1, wherein the clustering in said step (d) is performed in order of classification where the number of the classified first-order block candidates is greater.

8. The method as set forth in claim 1, wherein, in said step (d), any of said first-order blocks clustered to the same pattern is selected as a representative region, parameters about the address, luminance, and chrominances of said representative region are stored, and the remaining first-order blocks are coded with transformation coefficients of a rotational angle, a luminance, and chrominances based on said representative region.

9. The method as set forth in claim 8, wherein, in the classification of the second-order block candidates in said step (f), said second-order block candidate is classified into any one of predetermined patterns, based on said representative region of said first-order blocks constituting each said second-order block candidates and on said transformation coefficients.

10. The method as set forth in claim 1, wherein, in said step (g), said transformation coefficients of said first-order blocks constituting one of said second-order block candidates can be approximated by linear transformation in a case where the error with the transformation coefficient in another said second-order block candidate is less than a predetermined threshold value, when said transformation coefficients are approximated with shifted and multiplied by fixed quantities.

11. A method of encoding a digital image, comprising the steps of:
(a) segmenting said digital image into a plurality of primitive regions;
(b) classifying said primitive region into corresponding one of predetermined patterns, and computing for each said primitive region, a parameter about the classified pattern and parameters about the luminance and the chrominances of the primitive region;
(c) merging said plurality of primitive regions to generate first-order block candidates;
(d) classifying each of said first-order block candidate by the parameters about the classified pattern of said primitive region constituting the first-order block candidate; and
(e) clustering, as a first-order block, said first-order block candidates which belong to the same classification, the parameters about the luminance and chrominances of said primitive regions in which can be approximated by linear transformation, and representing transformation coefficients of said linear transformation as parameters.

12. The method as set forth in claim 11, wherein said patterns are defined in accordance with existence of a change of a plurality of pixels constituting said primitive regions.

13. The method as set forth in claim 11, wherein said step (d) classifies said first-order block candidate, based on said primitive region patterns of said primitive regions constituting said first-order block candidate and on rotational angle corresponding to said pattern.

14. The method as set forth in claim 11, wherein in said step (e) said first-order blocks adjacent to one another are disposed so as to overlap one another.

15. The method as set forth in claim 11, wherein, in said step (e), the meaning that "the transformation coefficients of said first-order blocks thereof can be approximated by linear transformation" means a case where the error is less than a predetermined threshold value, when the parameters about the luminance and the chrominances of one of said first-order block candidates are approximated with those of another first-order block candidate, shifted and multiplied by fixed quantities.

16. The method as set forth in claim 11, wherein the clustering in said step (e) is performed in order of classification where the number of the classified first-order block candidates is greater.

17. A system for encoding a digital image, comprising:
image input means for inputting said digital image;
means for segmenting said digital image into a plurality of primitive regions and computing for each said primitive region, parameters about the luminance and chrominances of the primitive region;
means for merging said plurality of primitive regions to generate first-order block candidates and classifying each of said first-order block candidates into any one of a plurality of predetermined patterns;
means for clustering, as a first order block, the first-order block candidates which belong to the same classification, and the parameters about the luminance and chrominances of said primitive region in which can be approximated by linear transformation, and representing transformation coefficients of said linear transformation as parameters;
means for merging a plurality of the first-order blocks to generate second-order block candidates and classifying the second-order block candidate in accordance with a pattern of each said first-order blocks constituting said second-order block candidate;
means for clustering, as a second-order block, the second-order block candidates which belong and to the same classification, and the transformation coefficients of said first-order blocks in which can be approximated by linear transformation, and representing a transformation coefficient of said linear transformation as parameters;
control means for recursively executing steps (e) and (g) while raising the order of the block in sequence until the clustering of the blocks becomes impossible; and
means for encoding the parameters of the coexisting multi-order blocks.

18. A system for encoding a digital image, comprising:
image input means for inputting said digital image;
means for segmenting said digital image into a plurality of primitive regions and computing for each said primitive region, parameters about the luminance and the chrominances of the primitive region;
means for merging said plurality of primitive regions to generate first-order block candidates and classifying said first-order block candidate into corresponding one of predetermined patterns; and
means for clustering, as a first-order block the first-order block candidates which belong to the same classification, and the parameters about the luminance and chrominances of said primitive region in which can be approximated by linear transformation, and representing transformation coefficients of said linear transformation as parameters.

19. A method of decoding a digital image, comprising the steps of:
(a) computing parameters about the luminance and chrominances of a primitive region in a representative region of clustered first-order blocks;
(b) computing the parameters about the luminance and chrominances of the remaining first-order blocks, based on said parameters about an address of said representative region, an rotational angle against said representative region, and a transformation coefficient of linear transformation for the luminance and chrominances of said primitive region; and
(c) secursively executing steps (a) through (b) while raising the order of the block in sequence.

* * * * *